US012646444B2

(12) United States Patent
Weihmann et al.

(10) Patent No.: US 12,646,444 B2
(45) Date of Patent: Jun. 2, 2026

(54) LIGHT CONTROL DEVICE, SYSTEM FOR ADAPTING LUMINOSITY DEPENDING ON AMBIENT LIGHT, USE OF SUCH A SYSTEM, AND COMPUTER PROGRAMME

(71) Applicant: Andreas Weihmann, Obernkirchen (DE)

(72) Inventors: Andreas Weihmann, Obernkirchen (DE); Friedrich Rempuschefsky, Auetal (DE)

(73) Assignee: Andreas Weihmann, Obernkirchen (DE)

( * ) Notice: Subject to any disclaimer, the term of this patent is extended or adjusted under 35 U.S.C. 154(b) by 0 days.

(21) Appl. No.: 18/848,694

(22) PCT Filed: Mar. 23, 2023

(86) PCT No.: PCT/EP2023/057420
§ 371 (c)(1),
(2) Date: Oct. 17, 2024

(87) PCT Pub. No.: WO2023/180425
PCT Pub. Date: Sep. 28, 2023

(65) Prior Publication Data

US 2025/0209969 A1 Jun. 26, 2025

(30) Foreign Application Priority Data

Mar. 24, 2022 (DE) ..................... 10 2022 106 965.6

(51) Int. Cl.
*G09G 3/32* (2016.01)
*G09F 9/33* (2006.01)

(52) U.S. Cl.
CPC ................. *G09G 3/32* (2013.01); *G09F 9/33* (2013.01); *G09G 2330/04* (2013.01); *G09G 2360/144* (2013.01)

(58) Field of Classification Search
CPC ................. G09G 3/32; G09G 2330/04; G09G 2360/144; G09F 9/3026; G09F 9/33;
(Continued)

(56) References Cited

U.S. PATENT DOCUMENTS 8,993,916 B2 3/2015 Palvadi et al.
2007/0062084 A1* 3/2007 Rosa ....................... G09F 13/22
40/544

(Continued)

FOREIGN PATENT DOCUMENTS

DE 299 18 847 U1 2/2001
DE 10 2012 008 736 A1 11/2013

(Continued)

*Primary Examiner* — Muhammad N Edun
(74) *Attorney, Agent, or Firm* — WCF IP

(57) ABSTRACT

The invention relates to a light control device for adapting luminosity depending on ambient light for a display device, which has at least one pixel technology-based display panel for displaying changing motives, which display panel has a plurality of separately actuatable display pixels. The invention additionally relates to a system for adapting luminosity depending on ambient light for a display device, which has at least one pixel technology-based display panel for displaying changing motives, which display panel has a plurality of separately actuatable display pixels. The invention additionally relates to the use of such a system and a computer program for a light control device.

21 Claims, 2 Drawing Sheets

(58) Field of Classification Search
CPC ......... G09F 21/04; G09F 19/22; H05B 45/12; H05B 47/11
See application file for complete search history.

(56) References Cited

U.S. PATENT DOCUMENTS

| | | | | |
|---|---|---|---|---|
| 2013/0147368 | A1 | 6/2013 | McCavit et al. | |
| 2017/0290129 | A1 | 10/2017 | Kashani | |
| 2018/0018062 | A1* | 1/2018 | Takahashi ............. | G01J 1/4204 |
| 2018/0336823 | A1* | 11/2018 | Lin ...................... | G09G 3/3258 |
| 2020/0217713 | A1 | 7/2020 | Wang et al. | |
| 2020/0348790 | A1 | 11/2020 | Vampola et al. | |

FOREIGN PATENT DOCUMENTS

| | | | |
|---|---|---|---|
| DE | 20 2020 105 776 | U1 | 12/2020 |
| DE | 10 2019 215 354 | A1 | 4/2021 |
| WO | 2020/216687 | A1 | 10/2020 |

* cited by examiner

Figure 1: components of a non-LTE system or display device ( ---- )
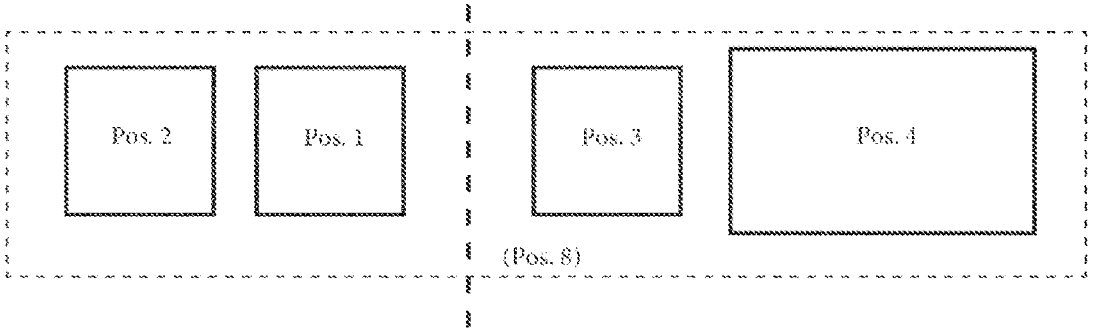
Figure 2: information flow/data flow
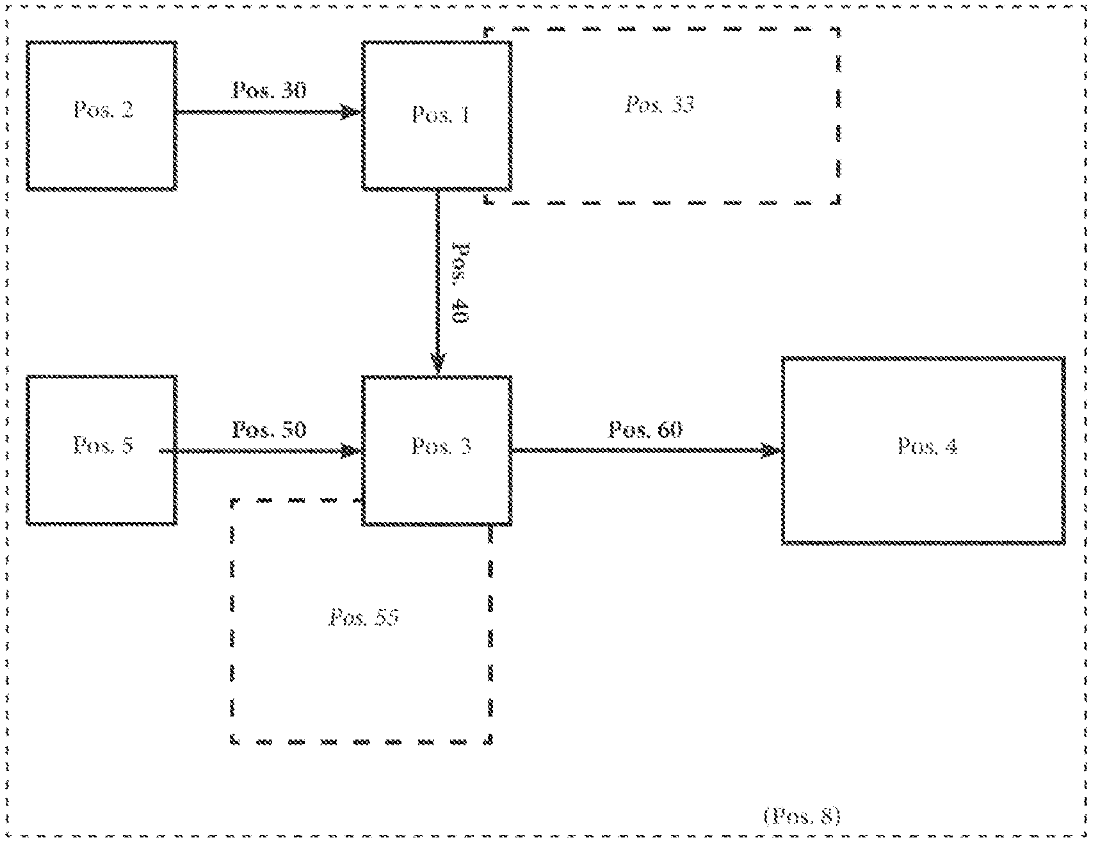

Figure 3 traffic zones
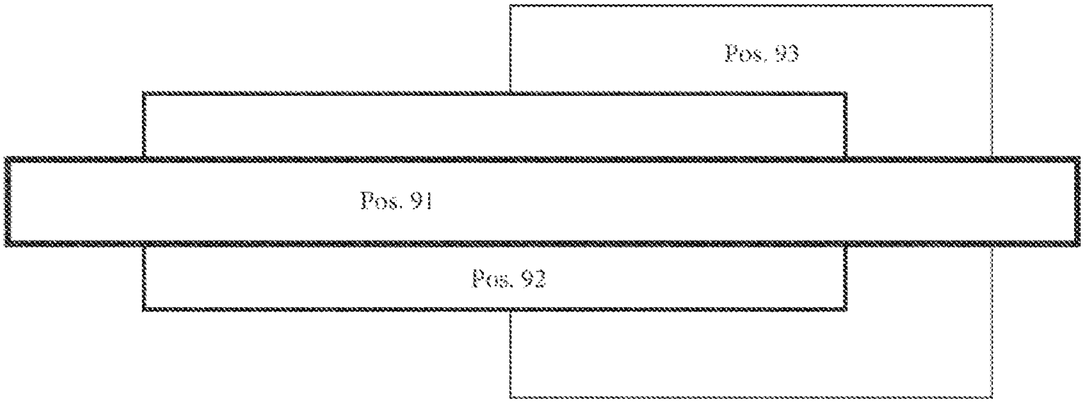
Figure 4 method application "non-LTE" display device
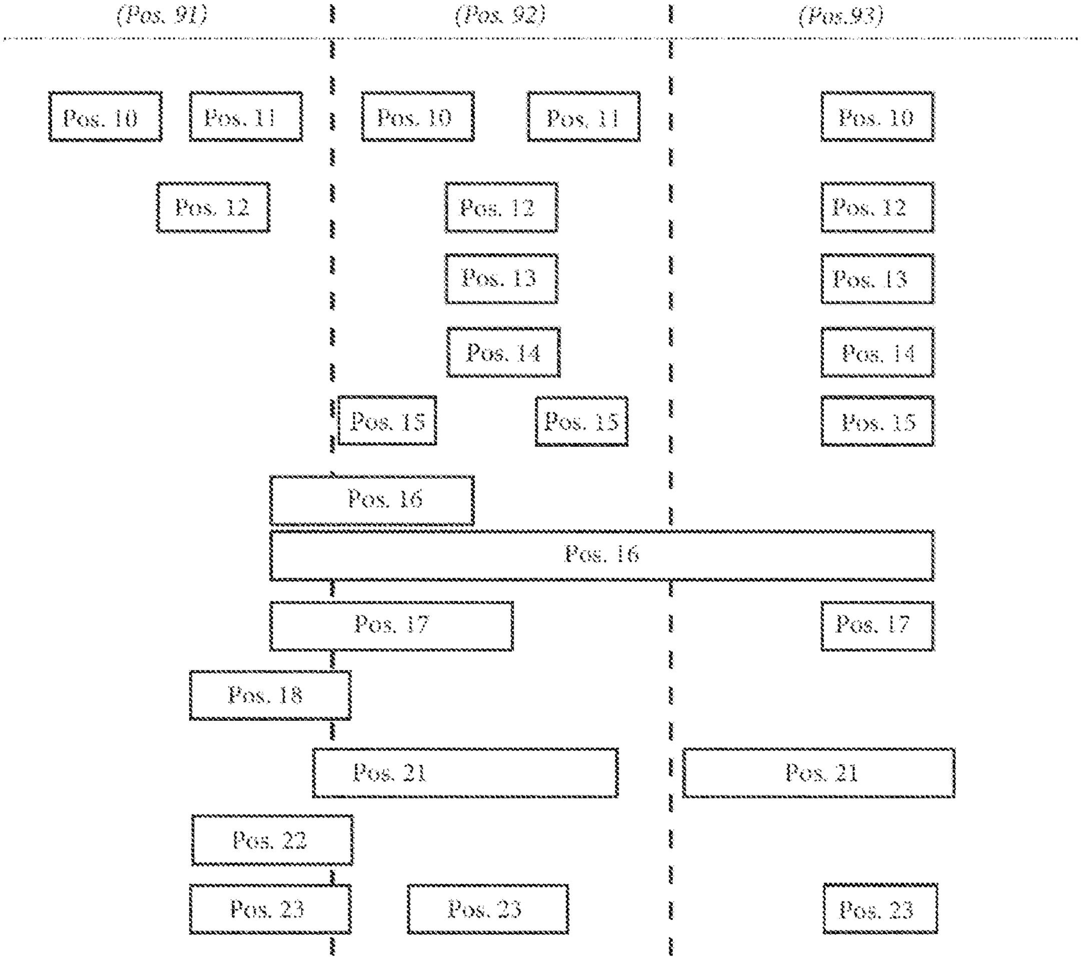

LIGHT CONTROL DEVICE, SYSTEM FOR ADAPTING LUMINOSITY DEPENDING ON AMBIENT LIGHT, USE OF SUCH A SYSTEM, AND COMPUTER PROGRAMME

The invention relates to a light control device for adapting luminosity depending on ambient light for a display device, which has at least one pixel technology-based display panel for displaying changing motifs, which display panel has a plurality of separately actuatable display pixels. The invention additionally relates to a system for adapting luminosity depending on ambient light for a display device, which has at least one pixel technology-based display panel for displaying changing motifs, which display panel has a plurality of separately actuatable display pixels. The invention additionally relates to the use of such a system and a computer program for a light control device.

The invention especially relates to a "non-LTE" light control device, a system for adapting luminosity depending on ambient light, the use of such a system, and a "non-LTE" computer program.

The proposal is known from WO 2020/2106687 A1 of attaching a pixel technology-based display panel for displaying changing motifs to a utility vehicle structure, for example, to display advertising information on the utility vehicle.

The invention is based on the object of further optimizing the control of the light emission of such a pixel technology-based display panel and opening up additional advantageous areas of application. This is based in particular on the measure of controlling the display brightness of the display device in real time, thus simultaneously to the ambient brightness depending on the mobility of the object on which the display device is installed.

This object is achieved by a light control device for adapting luminosity depending on ambient light for a display device, for example, for displaying information in the public sphere, which has at least one pixel technology-based display panel for displaying changing motifs, which display panel has a plurality of separately actuatable display pixels, wherein the light control device is configured to evaluate at least one ambient light measured value from at least one ambient light sensor and, depending on the at least one ambient light measured value, operating the display panel at all times as a non-light technology device (non-LTE) as defined in traffic regulations by controlling the light emission of the display panel. It can be ensured reliably by such a light control device that the display result of the pixel technology-based display panel generated and produced by the adaptation of the luminosity with respect to the visual perception in human observers ensures the impression "is not luminous" or at least "is not clearly luminous". In such a case, the pixel technology-based display panel having the control by the light control device can be used, for example, on vehicles and in the area close to the road even without special authorization formalities. The pixel technology-based display panel is then not considered a signal light. The light control device can accordingly also be referred to as a "non-LTE" light control device.

The light control device can be configured to evaluate at least multiple ambient light measured values per second from at least one ambient light sensor and to actuate the display in the above-explained meaning depending on the at least multiple ambient light measured values per second by controlling the light emission of the display panel. It can be ensured particularly reliably in this way that the display result generated and produced by the luminosity adaptation with respect to the visual perception in the human observer ensures the impression "is not luminous" or at least "is not clearly luminous".

A display technology friendly to changing motifs is provided by the pixel technology-based display panel, for example, in the form of an outside advertising display, having the explained luminosity adaptation, which is suitable for displaying fundamentally arbitrary changing motifs and can generate, permit, and/or ensure motif changes similar to labels and/or typographic displays.

The pixel technology-based display panel can be implemented, for example, as a display or as a display network having individual display pixels or cells. The display panel or the arrangement of display pixels can have, for example, a rectangular shape. The display pixels can be arranged distributed flatly in the form of a matrix over the area of the display panel.

The display panel or the arrangement of the display pixels can have, for example, a rectangular shape. The display pixels can be arranged distributed flatly in the form of a matrix over the area of the display panel.

Furthermore, the object is achieved by at least one high-performance light sensor, which measures the ambient light multiple times per second. The real-time, simultaneous luminance adaptation of the outside display can be implemented particularly well in this way and the display result "non-LTE" can be ensured.

Due to the combination of non-LTE light control device and high-performance light sensor having multiple ambient light measurements per second, a light control technology is achieved and made available for the first time which ensures the outside display actuation relative to the ambient light in a traffic-safe manner in real time.

The inventive step in WO 2020/2106687 A1 is the non-LTE as such. The non-LTE is a light-emitting technology which displays changing motifs on displays less than +0.5 cd/m$^2$ or at most +0.5 cd/m$^2$ in relation to the ambient light simultaneously in real time.

The light control device can be designed as a "non-LTE" light control device and can be configured to switch on the display device and/or the adaptation of the luminosity by means of "non-LTE" computer program upon exceeding a first daylight threshold value and to switch it off upon falling below a second daylight threshold value.

A further relevant variable is the daylight threshold value, which can be, for example, 1000 lux.

The non-LTE light control device according to the invention can include both:

the luminance limiting value of +0.5 cd/m$^2$ and the daylight threshold value of 1000 lux; at less than 1000 lux, the outside display remains switched off (no display), from 1000 lux, the outside display is actuated, specifically with at most 0.5 cd/m$^2$ in relation to the ambient light, so that the display luminance in this example is at least 1000.5 cd/m$^2$. Instead of the value of 1000 lux, another suitable daylight threshold value can also be used.

According to one advantageous embodiment of the invention, it is provided that the light control device is configured to switch on the luminosity adaptation, i.e., the control of the light emission of the display panel depending on the ambient light, upon exceeding a first daylight threshold value and to switch it off upon falling below a second daylight threshold value. The first daylight threshold value can be, for example, 1000 lux, however, it can also be a lesser value of 500 lux or 750 lux. The first daylight threshold value can in particular be in the range from 400 lux to 1100 lux. The second daylight threshold value can be equal to the first daylight threshold value or, in order to implement a hysteresis in the switching, less by a differential value than the first daylight threshold value. The differential value can be, for example, 10 lux, or in the range from 10 lux to 50 lux.

According to one advantageous embodiment of the invention, it is provided that the light control device is configured, by continuous offsetting, for example, in real time, of the ambient light measured values from the at least one ambient light sensor with a relative light limiting value, to generate the control signals to be output to control the light emission of the display panel and thus to ensure that the entire display panel or one or multiple parts thereof are caused to appear non-luminous depending on the ambient light. In this way, it can be ensured by the light control device that the display panel is not perceived as "luminous" in the human visual perception. The light limiting value can be stored, for example, as a fixed or adjustable parameter in the light control device. Multiple light limiting values can also be stored, for example, for different luminosity ranges or brightness ranges of the ambient light.

According to one advantageous embodiment of the invention, it is provided that the light control device is configured to limit the light emission of the display panel by way of the output control signals so that the light emission of the display panel is less than or at most +0.5 cd/$m^2$ in relation to the average relative ambient light. In this way, the strength of the light emission is limited to an amount which can be readily accepted in road traffic, in particular without special authorization proceedings. In particular, the display panel, although it is self-luminous, can be classified as a non-light technology device so that no authorization as a light-technology device is necessary.

The underlying light limiting value formula for this purpose in the light control device is "lim $D_{Non\text{-}LTE}$=d+0.5 cd/m1". The formula components of the "non-LTE"-light limiting value formula "lim $D_{Non\text{-}LTE}$" for the "non-LTE"-light control device for "non-LTE" outside displays are a) >lim D< for the ambient light-relative light limiting value,
b) >d< for the relative ambient luminance, and
c) >$D_{Non\text{-}LTE}$< for the ambient light-relative non-LTE luminance.

According to one advantageous embodiment of the invention, it is provided that at least one light sensor is provided per side of a device equipped with a display panel, which sensor is installed, for example, parallel to the light emission main axis of the display panel on the same side of the device, so that the light control device can be supplied with the ambient light data relevant to the device system and in this way the light emission of the display panel can be adapted in accordance with the ambient light relevant for the perception of the display panel.

According to one advantageous embodiment of the invention, it is provided that the light control device is configured to carry out the conversion of the ambient light measured values from the at least one ambient light sensor into the control signals to be output by means of a degressive or hyperbolic characteristic curve, using which the ambient light measured values are convertible degressively or hyperbolically into absolute light emission values of the display panel or into relative luminance values of the display panel. The light control characteristic can be adapted particularly well to the human visual perception by such a degressive or hyperbolic characteristic curve. For example, the degressive characteristic curve can be designed in such a way that a light emission value in cd or cd/$m^2$ is determined therefrom depending on an ambient light value measured in lux. With small input values, relatively large output values of the characteristic curve are determined here, with larger input values, relatively smaller output values are determined (degressive characteristic). The characteristic curve can be implemented, for example, as a conversion formula stored in the light control device, or in the form of a table of multiple conversion values, which represent so to speak support points of the characteristic curve. A linear or nonlinear interpolation can be carried out between the support points, for example, according to the spline method. For example, the light control device can determine the respective relative light limiting value from this degressive or hyperbolic characteristic curve.

A light-technology display device can therefore be provided by the invention, which is considered "nonluminous" in the meaning of the traffic regulations. This is the case when the radiance of the display device is not more than 0.5 cd in relation to the ambient light of, for example, 0.0 lux or 0.0 cd; in this example thus not more than 0.5 cd. The light limiting value 0.5 cd is the light limiting value in absolutely dark night, usually measured in the light laboratory. During the day, a light limiting value at 10 000 lux ambient light could then apply to a linearly scaled light limiting value of 10 000.5 cd. However, this has proven to be excessively glaring in practice, so that the inventor has done their own parameter ascertainment in the meaning of basic research, in order to ascertain suitable light limiting values for various ambient light situations of daylight and twilight, so that the visual perception impression "nonluminous" is maintained. The ascertained light limiting values during the day and during twilight do not run linearly and are photometrically significantly below the applicable limit of +0.5 cd.

According to one advantageous embodiment of the invention, it is provided that the light control device is configured to carry out the conversion of the ambient light measured values from the at least one ambient light sensor into the control signals to be output by means of one, several, or all of the following associations:

- the light limiting value at 100 lux ambient light is approximately 10.5 cd/$m^2$,
- the light limiting value at 120 lux ambient light is approximately 14.2 cd/$m^2$,
- the light limiting value at 320 lux ambient light is approximately 45.9 cd/$m^2$,
- the light limiting value at 500 lux ambient light is approximately 169.6 cd/$m^2$,
- the light limiting value at 550 lux ambient light is approximately 175.2 cd/$m^2$,
- the light limiting value at 1000 lux ambient light is approximately 238.0 cd/$m^2$,
- the light limiting value at 2000 lux ambient light is approximately 400.0 cd/$m^2$,
- the light limiting value at 3000 lux ambient light is approximately 1238.0 cd/$m^2$,
- the light limiting value at 5000 lux ambient light is approximately 1400.0 cd/$m^2$,
- the light limiting value at 10 000 lux ambient light is approximately 2238.0 cd/$m^2$,
- the light limiting value at 20 000 lux ambient light is approximately 2400.0 cd/$m^2$,
- the light limiting value at 30 000 lux ambient light is approximately 3238.0 cd/$m^2$,
- the light limiting value at 38 381 lux ambient light is approximately 4250.0 cd/$m^2$,
- the light limiting value at 41 000 lux ambient light is approximately 4400.0 cd/$m^2$, the light limiting value at 50 000 lux ambient light is approximately 5500.0 cd/m$^2$, the light limiting value at 75 000 lux ambient light is approximately 8500.0 cd/m$^2$, the light limiting value at 90 000 lux ambient light is approximately 10 500.0 cd/m$^2$, the light limiting value at 100 000 lux ambient light is approximately 11 500.0 cd/m$^2$, the light limiting value at 110 000 lux ambient light is approximately 12 500.0 cd/m$^2$.

In this way, a specific degressive characteristic curve of the above-explained type can be implemented using individual support points. As mentioned, upon the occurrence of ambient light values between the support points, an interpolation can be carried out.

According to one advantageous embodiment of the invention, it is provided that the light control device is configured, upon a transition of the ambient light from bright to dark, to limit the change of the control signals for controlling the light emission of the display panel to a first transition gradient, by which the light emission of the display panel is gradually reduced to a value corresponding to the darker ambient light. It is ensured by the first transition gradient that even in the event of a very rapid transition of the ambient light from bright to dark, for example, upon the entry of a vehicle into a tunnel, a gradual reduction of the light emission of the display panel is carried out. In particular, a transition more pleasant for the human perception can be implemented.

According to one advantageous embodiment of the invention, it is provided that the light control device is configured, upon a transition of the ambient light from dark to bright, to limit the change of the control signals for controlling the light emission of the display panel to a second transition gradient, by which the light emission of the display panel is gradually increased to a value corresponding to the brighter ambient light. In this way, a gradual increase of the light emission of the display panel can be implemented even in the event of a relatively rapid transition of the ambient light from dark to bright, for example, upon driving out of a tunnel. The circumstance can in particular be taken into consideration in this way that the human eye also becomes accustomed to such brightness transitions with a temporal gradient.

It is also advantageous if the light control device is configured, upon a transition of the ambient light from dark to bright, to adapt the change of the control signals for controlling the light emission in the meaning of adapting luminosity of the display panel, generally more slowly and/or more slowly depending on speed to the light limiting value depending on the relative ambient light than simultaneously in real time, so that the human observer who is still located in the darker area as a following road user is not displayed anything bright suddenly or in a flash by the vehicle outside display.

The first transition gradient and/or the second transition gradient can be a gradient which is linear or nonlinear over time in terms of a consistent transition function. The first and/or the second transition gradient only causes limiting of the speed at which the luminosity of the display panel is changed. If the actual transition of the ambient light from bright to dark or dark to bright is in any case lower than the corresponding transition gradient, no limiting then takes place.

In general, it is advantageous if the adaptation of the luminosity is linear, uniform, and/or step-by-step.

According to one advantageous embodiment of the invention, it is provided that the first transition gradient is greater than the second transition gradient. This has the advantage that a particularly efficient adaptation of the light emission control to the properties of human perception can be implemented. Because the first transition gradient is greater than the second transition gradient, the light emission is reduced relatively quickly during the first transition of the ambient light. During the second transition, the light emission is only increased relatively slowly. For example, the first transition gradient can be at least twice as large as the second transition gradient, or at least three times as large or at least five times as large.

According to one advantageous embodiment of the invention, it is provided that the light control device has a computer, wherein the light control device is configured to execute a computer program on the computer and in this way to carry out the control of the light emission of the display panel. This has the advantage that the above-explained control functions of the light emission can be implemented by corresponding programming of the computer program. This in particular also enables a flexible adaptation of the control functions by simply changing the computer program. The hardware of the light control device generally does not have to be changed for this purpose. Alternatively, the light control device can also include the described control functions of the light emission by the implementation by means of hardware components, for example, in that the control functions are implemented on an FPGA (Field Programmable Gate Array).

According to one advantageous embodiment of the invention, it is provided that the computer program and/or the data used by the computer program can be changed only after an authorization and/or not by remote access. A high level of security of the functions of the light control device from unauthorized manipulations is implemented in this way. In particular, the light control device having the functionality of controlling the light emission, for example, by means of the computer program or an app, can only be accessible to authorized persons. In particular, a remote access via wireless data connections is prevented in this way. For example, the light control device can be designed in such a way that a change of the computer program and/or the data is only possible by means of a wireless short-range transmission, e.g., Bluetooth, NFC, or the like, or by connecting a cable connection. A password protection can be implemented for the authorization, for example.

According to one advantageous embodiment of the invention, it is provided that the light control device is protected from unauthorized access by at least one sealing element. In this way, the light control device can be protected even better from unauthorized changes. The sealing element can cause, for example, mechanical sealing of the light control device, for example, in the manner of a lead seal. A lock can also be provided as a sealing element. Moreover, it is advantageous if the light control device has a mechanically stable housing, for example, a metal housing.

The object mentioned at the outset is additionally achieved by a system for adapting luminosity depending on ambient light for a display device, which has at least one pixel technology-based display panel for displaying changing motifs, which display panel has a plurality of separately actuatable display pixels, wherein the system has at least one light control device of the above-explained type, at least one ambient light sensor connected to the light control device, and the at least one pixel technology-based display panel, for example, for displaying outside advertising or other public information. The above-explained advantages can also be implemented in this way.

According to one advantageous embodiment of the invention, it is provided that the display technology of the display panel is light-emitting or non-light-emitting or backlit or illuminated. In particular, the display panel can have reflective display pixels.

According to one advantageous embodiment of the invention, it is provided that the ambient light sensor and the light control device are one unit with respect to data processing and/or are designed as one assembly with respect to the device. In this way, the system can be provided in a manner easily handled by the user, which is moreover secure from manipulation. The light control device and the ambient light sensor can be, for example, completely placed in a housing.

According to one advantageous embodiment of the invention, it is provided that the ambient light sensor and/or the light control device form a structural unit with the at least one pixel technology-based display panel. An overall system easily usable for the user is provided in this way, which already has the pixel technology-based display panel. The pixel technology-based display panel can be actuated by the light control device directly or indirectly via a pixel controller (Pos. 3).

In one advantageous embodiment of the invention, the system has at least one ambient light sensor having a diffusion lens and at least one ambient light sensor having a clear lens. To generate an optimum luminance of the display panel, the ambient light values of the at least one ambient light sensor having diffusion lens and the ambient light values of the at least one ambient light sensor having clear lens are offset to form a resulting ambient light value, for example, by the light control device. This resulting ambient light value is then used for the control of the light emission of the display panel. The respective light sensor surface of the at least one ambient light sensor having clear lens and/or the at least one ambient light sensor having diffusion lens can be positioned parallel to the display surface of the display panel or differently.

The object mentioned at the outset is additionally achieved by the use of a system of the above-explained type for displaying advertising information and/or other information in the public sphere, in particular at vehicles on generally accessible traffic routes, parking areas, and/or in the area close to the road, and/or on stationary devices. The above-explained advantages can also be implemented in this way. In particular, the system can also be used in the area close to the road, i.e., not directly on traffic routes. The system can be used, for example, in the area close to the road in a range of up to 10 m outside a traffic route or up to 20 m outside a traffic route. For example, the area close to the road can have a distance of at least 2 m or at least 5 m from the traffic route.

The system can be used, for example, with display direction "outward" at or in vehicles of all types for transporting goods and heavy loads, but also at or in vehicles for transporting persons—such as trucks, buses, streetcars, trailers, bicycles, rickshaws, scooters, local and long-distance trains, delivery trucks, caravans, travel trailers, animal transport trailers, or cargo carriers attached to these vehicles, such as roof luggage racks, bicycle racks, and the like.

The system can be employed or used, for example, in road traffic and the areas adjacent to the road traffic, e.g. on parking bays and parking lanes, parking areas, and vehicle parking areas of companies, filling stations, or rest areas as well as green areas and other areas in the area of intersections with and without traffic signal systems, sidewalks, and pedestrian zones and also areas where, in addition to pedestrians, bicycles, skateboards, and electric motor-operated means of conveyance are used and/or are allowed to be used. The system can be used, for example, on scaffolds, display stands, pylons, and cranes of all types since these can also be used in proximity to the road and in pedestrian areas, since these can also be used in proximity to the road, pedestrian areas, and other traffic areas such as parking areas of supermarket centers.

The object mentioned at the outset is additionally achieved by a computer program for a light control device of the above-explained type, wherein the computer program is configured to carry out at least the control of the brightness of the light emission of the display panel when the computer program is executed on a computer of the light control device. The above-explained advantages can also be implemented in this way. The computer program can carry out one, several, or all of the above-explained light control functions of the light control device here. The computer program can be designed, for example, as software or an app. In particular, the computer program can be designed as a "non-LTE" computer program.

The display panel can be designed as a black-and-white or grayscale display panel. In this case, the individual display pixels can be designed as monochromatic and can therefore only be actuated between the statuses bright/dark.

According to one advantageous embodiment of the invention, it is provided that the display panel is designed as a color display panel for displaying colored motifs. In this way, the display panel is usable substantially more universally than in the case of a solely black-and-white or grayscale display. In particular, all possible motifs can be displayed better. The display panel can have, for example, display pixels in different colors to implement the display of colored motifs, for example, according to the RGB color scheme or color system or preferably the CMY or CMYK color scheme or color system. In particular, the display panel can be designed as a color display panel having CMY or CMYK electro-wetting technology.

According to one advantageous embodiment of the invention, it is provided that the display panel is designed as a light-emitting display panel. The display panel is then designed as self-luminous. This has the advantage that the motifs can be displayed on the display panel significantly more clearly and with improved contrast and also during daylight. In particular with a color display, the brilliance of the display can be significantly improved. Furthermore, the light-emitting display panel can also be used in the dark if necessary.

According to one advantageous embodiment of the invention, it is provided that the display panel has a background light for increasing the contrast of the display pixels and/or self-luminous display pixels. Different technologies can be used to implement the display pixels, preferably the technology of electro-wetting (also called E wetting for short). The individual display pixels can be designed, for example, if they are designed as self-luminous display pixels, as LED or SMD.

According to one advantageous embodiment of the invention, it is provided that the pixels of the display panel are translucent. This has the advantage that the display panel thus corresponds to the reprographic standards of the 20$^{th}$ and 21$^{st}$ century in particular in digital printing, in offset printing, and in inkjet printing, so that a maximum color brilliance with the least possible print-graphic effect of so-called "muted" colors results and is ensured. Muted colors are colors mixed with black; the impression of darkened coloration or colored dirtiness then results.

According to one advantageous embodiment of the invention, it is provided that the pixel distance between the display pixels of the display panel is at least 1 mm, or at least 2.5 mm, or at least 4 mm. The pixel distance (pitch) of the display pixels is therefore selected to be comparatively large, which has the advantage for the display of motifs outside that they can be perceived as pleasant from the desired distance, for example, from an observation distance of approximately 2.5 m or approximately 5 m, by observers. Moreover, this prevents observers from having the wish to observe the displayed motif from a lesser observation distance. It is no longer possible to reasonably perceive the motif at lesser observation distance due to the pixel distance.

According to one advantageous embodiment of the invention, it is provided that the display panel is preferably used for static, non-dynamic motifs or typographic images. Furthermore, the advantageous embodiment also corresponds to the requirement that the changing sequence as such does not generate any dynamic image effects, so that in particular neither the following traffic or following road users nor other road users can be distracted from the traffic by dynamic display content or effects.

According to one advantageous embodiment of the invention, it is provided that the display panel has a surface area of at least 0.25 $m^2$, 0.5 $m^2$, or 1 $m^2$. Accordingly, the display pixels of the display panel occupy at least the mentioned area of at least 0.25 $m^2$, 0.5 $m^2$, or 1 $m^2$.

The present invention therefore relates to the field of a non-light technology device (non-LTE) for displaying changing motifs. The invention additionally relates to a special control device, namely the mentioned light control device, for a non-light technology device for displaying changing motifs. The invention is suitable, among other things, especially for a utility vehicle structure having integrated display having at least one such device and for a cargo carrier structure for buses of all types. Furthermore, the invention relates to light-emitting displays of all types and backlit display surfaces, which are employed or used in road traffic and the areas adjoining the road traffic, e.g., on parking bays and parking lanes, parking areas, and vehicle parking areas of companies, filling stations or rest areas, as well as green areas and other areas in the area of intersections with and without traffic signal systems, sidewalks and pedestrian zones, and also areas where, in addition to pedestrians, bicycles, skateboards, and electric motor-operated means of conveyance are used and/or are allowed to be used. Moreover, the invention relates to scaffolds, display stands, and cranes of all types, since these can also be used in proximity to the road and in pedestrian areas.

The present invention is to avoid accidents in road traffic and pedestrian traffic in that the unobtrusive display type of the non-LTE helps to avoid unobtrusively distracting visual perception effects of advertising and other display motifs for observers and road users of all types.

According to one advantageous embodiment of the invention, for example, a non-LTE refers to a light-emitting or non-light-emitting display device which displays visually perceptible motifs by means of the display with a luminance of less than +0.5 cd/$m^2$ (candela per square meter) in relation to the cumulative relative ambient light. In particular, a non-LTE ensures that the visual perception impression “luminous” does not occur. A non-LTE can have a high-performance ambient light sensor with attached light control device, which generates light-technology non-LTE output data by means of offsetting the light-technology input data from the at least one ambient light sensor, which ensures visual display values in the display that are similar or equivalent to the visual impression of a high-quality digital print on paper, film, canvas, or mesh fabric.

The present invention relates in an advantageous embodiment to general display devices for changing motifs for vehicles, such as trucks, as well as trailers, semitrailers, cargo carrier structures for buses, and in particular vehicle bodies and add-ons having communication-technology side, roof, and rear devices. The present invention relates in an advantageous embodiment in particular to vehicles which are used for the transport of goods and of heavy loads, but also for the transport of persons, also trains, taxis, and shuttles of all types.

With regard to the application of the non-LTE (non-light technology device of vehicles) with the “non-LTE” light control device in vehicles, the invention represents the refinement of the invention described in the PCT application WO 2020/2106687 A1 of Andreas Weihmann, for example, with regard to software or apps for adapting the luminosity of the pixels of the display panel and for adapting the color contrast of the pixels of the display panel and for adapting the color of the pixels of the display panel, which can be implemented as software of the “non-LTE” light control device.

As already listed in the introduction, among other things, all truck or trailer structures such as utility vehicle structures, trailer structures, and all other structures are to be subsumed as usage areas of the system in the scope of the present invention, which are typically provided on the rear with a tarpaulin, with a rolling door, with a flap, with a stage, or with a two-leaf or multi-leaf door, as well as utility vehicles of all types for transporting persons.

Structures for utility vehicles are referred to in general as a utility vehicle structure, such as structures in the area of a cargo space or a cargo surface. Depending on the type of the utility vehicle, the structures can comprise side, roof, and/or rear walls and/or flexible tarpaulins. Utility vehicles are, for example, trucks and their trailers or semitrailers and also other vehicle trailers of all types, buses of all types and streetcars of all types. The present invention also relates to cargo carrier structures for buses of all types, which are structurally integrated or retrofitted on cargo carrier eyelets provided for this purpose on the rear on buses.

The ambient light sensor or the high performance measurement sensor measures the ambient light at least once per second, but preferably ten times or more per second, so that real-time simultaneity is achieved or ensured metrologically and with respect to actuation.

The “non-LTE” light control device can be operated using special software or an app. This offsets the data of the ambient light measurements of the ambient light measurement sensor with the light limiting value data of light limiting values ascertained in independent basic research for, for example, a light-emitting SMD display technology and regulates the attached display panel individually using corresponding display data (output). The SMD display panel of the mentioned basic research for ascertaining parameters of the light limiting values during the day and during twilight had a pitch of 2.5 mm.

Ambient light sensor and light control device can represent one unit and/or form one assembly with respect to data processing. Moreover, it can be that the light control device is integrated by miniaturization in the housing of the ambient light sensor, so that a housing of the light control device is eliminated as a component.

According to one advantageous embodiment of the invention, the pixel technology-based display panel is equipped with a computer or connected to a computer. The individual pixels of the display panel can be actuated by the computer, i.e. the display of a motif on the display panel and a change between different motifs. The computer can be fastened, for example, on the component of the utility vehicle structure or integrated therein, if it is not part of the display panel. The computer can also be arranged separately on the utility vehicle. The computer can be connected to a data remote transmission device, via which the computer can remotely receive control commands and/or signage data which contain the motifs to be displayed on the display panel. The motif change can be controlled remotely via the control commands, for example. It is provided for this purpose, for example, that data remote transmission tunnels secure from external access are used in an operator-active and/or apparatus or device-active manner between the data-controlling and transmitting operator and the data-receiving computer. The computer can be designed as a commercially-available personal computer (PC), for example, as a mini PC. The switching on and/or the switching off of the onboard computer can advantageously take place independently of persons or in an automated manner, so that the vehicle battery having too little energy to start the vehicle and/or transport-relevant assemblies such as cooling assemblies not having enough power is avoided. The computer can also be described as a signage computer. The signage assembly advantageously has a separation from the operating system of the computer in order to ensure that exclusively signage data are displayed on the display panel. For this purpose, the computer advantageously has an integrated or connected signage player and/or an integrated or connected router having integrated or connected SIM card reader or interface including SIM card with or without active SIM card communication contract, or an alternative location-independent, non-hardware-connected communication option between operator managing data and signage and the computer. For signage operation which is as secured in access and free of disturbance as possible, preferably functional assembly modules are provided for computer, player, and router; routers with integrated SIM card slot have established themselves on the market independently of signage applications.

To generate suitable data regulating the pixel luminosity, it is provided according to one advantageous embodiment of the invention that special software or an app ensures the luminosity of the pixels of the display panel is adapted so that the pixels are actuated with less than 0.5 $cd/m^2$ light emission in relation to the ambient light.

To generate suitable data regulating the pixel color contrast, it is provided according to an advantageous embodiment of the invention that further special software or an app ensures the color contrast of the pixels of the display panel is adapted so that the pixels generate colors according to the relative ambient light conditions so that the pixels are actuated, on the one hand, with less than 0.5 $cd/m^2$ in relation to the ambient light and, on the other hand, colors are generated which neither achieve a signal effect nor avoidably distract from the traffic.

To generate suitable data regulating the pixel colors, it is also provided according to an advantageous embodiment of the invention that further special software or an app ensures the color of the pixels of the display panel is adapted so that the pixels generate colors according to the relevant ambient light conditions so that the pixels, on the one hand, are actuated with less than 0.5 $cd/m^2$ in relation to the ambient light and, on the other hand, colors are generated which neither achieve a signal effect nor avoidably distract from the traffic.

With respect to the software or apps for adapting the luminosity of the pixels of the display panel and for adapting the color contrast of the pixels of the display panel and for adapting the colors of the pixels of the display panel, advantageously only one item of software or app or fewer than three items of software or apps can advantageously be used.

A utility vehicle structure can be provided by the invention, the rear wall door of which can be opened as completely as possible even in tight space conditions and which causes lower costs in the production, in particular in the inscription and upon inscription change of the rear wall door but also in the sidewalls—whether they are tarpaulins or boxes or other structures—at least cumulatively over the entire usage time of the truck and/or trailer or its structures.

In the context of this application, “display” refers to any representative of a communication-technology display surface and/or technology, which is not embodied as analog but rather digital with respect to inscription technology; e.g., LED, electro-wetting, and other in particular future visualization technologies, which have the structural tendency to be pixel technology-based structure or display in nature.

The recipient impression is to be as similar as possible to that of conventional inscription mechanisms by means of analog inscription, in particular with regard to the light intensity. The digital utility vehicle structure inscription by means of display is to replace as much as possible the familiar inscription of rear, roof, and/or side walls and is in no way to generate a signal effect in the meaning of vehicle lights and/or identification.

The integrated utility vehicle structure display, for example, on rear, roof, or side walls is therefore to ensure contrasts dependent on the ambient light, which with regard to the superficial recipient impression are similar or close to the impression of conventional analog inscription, for example, to be confused for it.

In the context of this patent-law presentation, “display” refers to any representative of a communication-technology display surface and/or technology, which is not embodied as analog but rather digital with respect to inscription technology; e.g., LED, electro-wetting, and/or other in particular future visualization technologies, which have the structural tendency to be pixel technology-based structure or display in nature. Such a pixel technology-based display-technology network or display is used to generate items of work information similar to images and/or typography and can have modular system architecture—such displays can thus be in one piece and/or multiple pieces.

The invention will be explained in more detail on the basis of exemplary embodiments using drawings. In the figures FIG. 1 shows the components of a system for adapting luminosity depending on ambient light, FIG. 2 shows the data flow in the system according to FIG. 1, FIG. 3 shows traffic zones for the use of a system according to FIG. 1, FIG. 4 shows possibilities for using the system according to FIG. 1 in the individual traffic zones.

The system shown in FIG. 1 for adapting luminosity depending on ambient light includes as components, which overall form a non-LTE, for example, at least one ambient light sensor Pos. 2, a light control device Pos. 1, a pixel controller Pos. 3, and a pixel technology-based display panel Pos. 4. The mentioned components can each be designed as structurally separate components or can be entirely or partially structurally integrated with one another. For example, the ambient light sensor Pos. 2 and the light control device Pos. 1 can form a structural unit. In addition, the pixel controller Pos. 3 and the pixel technology-based display panel Pos. 4 can form a structural unit. The mentioned components can also form a common structural unit Pos. 8 as a whole.

The pixel controller Pos. 3 can form a display device with the pixel technology-based display panel Pos. 4. The pixel controller Pos. 3 is used to actuate the individual display pixels of the display panel Pos. 4, both with regard to the brightness and with regard to any existing color display. The system shown in FIG. 1 can be connected to a motif player, which is not shown in FIG. 1. Using the motif player Pos. 5, the motifs to be displayed on the pixel technology-based display panel Pos. 4, i.e. images and/or texts, can be provided in a defined format and transmitted to the pixel controller Pos. 3.

FIG. 2 shows the corresponding data flows in the system according to FIG. 1. Ambient light data are generated depending on the detected ambient light and transmitted to the light control device Pos. 1 by the at least one ambient light sensor Pos. 2. In the light control device Pos. 1, the ambient light data are offset with one or more relative light limiting values (Pos. 33). Data for the control of the light emission of the display panel Pos. 4 are then transmitted from the light control device Pos. 1 to the pixel controller Pos. 3, for example, in the form of non-LTE brightness data Pos. 40. The brightness data Pos. 40 can be scaled, for example, in the unit candela (cd) or candela per square meter ($cd/m^2$) or in digital RGB data, for example, as bit values.

Data for the corresponding motif to be displayed are transmitted from the above-mentioned motif player Pos. 5 to the pixel controller Pos. 3, for example, in the form of motif data Pos. 50. For example, the motif data Pos. 50 can contain corresponding brightness and color values, for example, in the form of RGB values for each display pixel of the display panel Pos. 4. The display pixels of the display panel Pos. 4 are then managed according to the brightness data Pos. 40 and the motif data Pos. 50 by the pixel controller Pos. 3. For example, management of the motif display and/or an actuation of the brightness of the display pixels (Pos. 55) takes place. The pixel controller Pos. 3 then transmits data Pos. 60 for the actuation of the display pixels of the display panel Pos. 4, for example, brightness data and/or color data (RGB)

Traffic zones in which a use of the system according to FIG. 1 can advantageously take place are to be explained on the basis of FIG. 3. One particularly advantageous use of the system is thus in the area of roadways or roads, which are designated as zone 1 (Pos. 91). In addition, an advantageous use of the system in the area close to the road is also possible, which is referred to here as zone 2 (Pos. 92). Zone 2 can begin, for example, at a distance of 0 to 5 m from the roadside, i.e. from the edge of zone 1, and end at a distance of 5 to 20 m from the roadside. In addition, the system according to the invention can also be advantageously used in an area farther from the road, which is referred to here as zone 3 (Pos. 93). Zone 3 can extend, for example, in a range from 20 to 200 m distance from the roadside.

Various possible uses of the system according to the invention, which are designated here with Pos. 10 to Pos. 23, are represented on the basis of FIG. 4, for example. The possible uses Pos. 10, Pos. 11, Pos. 12 are suitable in particular for zone 1 and zone 2. The possible uses Pos. 10 and Pos. 12 are also suitable for zone 3. The possible uses Pos. 13, Pos. 14, and Pos. 15 are suitable for zone 2 and zone 3. The possible uses Pos. 16 and Pos. 17 are suitable, for example, for zone 1 and zone 2, wherein they can also be employed overlapping in these zones. With the possible use Pos. 16, a use in all three zones 1 to 3 is also possible, also overlapping. The possible uses Pos. 18 and Pos. 21 are suitable for zones 1 and 2, wherein they can also be used overlapping in these zones. The possible use Pos. 21 can be used in zone 1 and zone 2, also overlapping, or in zone 3. The system according to FIG. 1 can accordingly be attached to one of the devices according to Pos. 10 to Pos. 23 or a device set up there.

LIST OF REFERENCE SIGNS

Pos. 1 non-LTE light control device (control device);
Pos. 2 ambient light sensor (sensor);
Pos. 3 pixel controller (controller);
Pos. 4 pixel technology-based display panel (display);
Pos. 5 motif playback device (player);
Pos. 8 non-LTE display device/system/apparatus (non-LTE);
Pos. 10 vehicles of all types
(e.g., automobiles, caravans, trucks, buses, rickshaws; trailers; two-wheeled vehicles, three-wheeled vehicles, quads, golf carts, funmobiles, excavators);
Pos. 11 electric mobility devices of all types (e.g., electric mopeds, electric scooters, electric wheeled vehicles, electric bicycles, electric wheelchairs);
Pos. 12 trains of all types (e.g., streetcar, subway, tram, tourist trains);
Pos. 13 cranes of all types (e.g., construction cranes, harbor cranes, digging cranes; booms);
Pos. 14 scaffold structures of all types (e.g., construction scaffolds, stages, hoists);
Pos. 15 display stands of all types (e.g., pylons, fences, lanterns, construction site display stands, signage display stands, event display stands);
Pos. 16 bridges of all types (e.g., traffic bridges, gangways, pedestrian bridges);
Pos. 17 braced stands of all types (e.g., garlands, braced posters or banners);
Pos. 18 fences of all types (e.g., construction fences, event barriers, property fences, banisters);
Pos. 21 vehicle parking areas and parking areas of all types (e.g., rest areas, filling stations, hotel, event, company, market, parking garages, parking areas);
Pos. 22 intersection areas with or without signal systems;
Pos. 23 stations of all types (e.g., bus, tram, streetcar, taxi, subway, train stations);
Pos. 30 ambient light data;
Pos. 33 offsetting the "ambient light data" with the "relative light limiting values";
Pos. 40 non-LTE brightness data (cd; $cd/m^2$);
Pos. 50 motif data (RGB; CMY; CMYK);
Pos. 55 management of the "display panel pixels":
management of motif displays;
actuation of brightness (non-LTE);
Pos. 60 actuation of display panel pixels:
brightness data;
color data;
Pos. 91 traffic zone 1 (roads, traffic routes, roadways);
Pos. 92 traffic zone 2 (stations; parking bays, parking lanes and areas; sidewalks);
Pos. 93 traffic zone 3 (pedestrian zones; rest areas; area relatively close to the road).

The invention claimed is:

1. A light control device for continuously adapting luminosity depending on ambient light for a display device, comprising:

at least one pixel technology-based display panel for displaying changing motifs, wherein the at least one pixel technology-based display panel has a plurality of separately actuatable display pixels, wherein the light control device is configured to evaluate at least one ambient light measured value from at least one ambient light sensor and to operate the at least one pixel technology-based display panel at all times to ensure that an entirety of the at least one pixel technology-based display panel or one or more parts thereof are caused to appear nonluminous depending on the at least one ambient light measured value by controlling light emission of the at least one pixel technology-based display panel, wherein the light control device is configured to carry out conversion of the at least one ambient light measured value from the at least one ambient light sensor into one or more control signals to be output according to a degressive or hyperbolic characteristic curve, wherein the at least one ambient light measured value comprises a plurality of ambient light measured values which are convertible degressively or hyperbolically into a plurality of absolute light emission values of the at least one pixel technology-based display panel or into a plurality of relative luminance values of the at least one pixel technology-based display panel.

2. The light control device as claimed in claim 1, wherein the at least one ambient light measured value comprises a plurality of ambient light measured values, and wherein the light control device is configured to generate control signals to control the light emission of the at least one pixel technology-based display panel by continuously offsetting the plurality of ambient light measured values from the at least one ambient light sensor with a relative light limiting value.

3. The light control device as claimed in claim 1 wherein the light control device is configured to limit light emission of the at least one pixel technology-based display panel by an output control signal so that the light emission of the at least one pixel technology-based display panel is less than +0.5 cd/$m^2$ in relation to an average relative ambient light.

4. The light control device as claimed in claim 1 wherein the light control device is configured, upon a transition of ambient light from bright to dark, to limit a change of control signals for controlling light emission of the at least one pixel technology-based display panel to a first transition gradient by which the light emission of the at least one pixel technology-based display panel is gradually reduced to a value corresponding to darker ambient light.

5. The light control device as claimed in claim 1 wherein the light control device is configured, upon a transition of ambient light from dark to bright, to limit a change of control signals for controlling light emission of the at least one pixel technology-based display panel to a second transition gradient by which the light emission of the at least one pixel technology-based display panel is gradually increased to a value corresponding to brighter ambient light.

6. The light control device as claimed in claim 5, wherein a first transition gradient by which the light emission of the at least one pixel technology-based display panel is gradually reduced to a value corresponding to darker ambient light is greater than the second transition gradient.

7. The light control device as claimed in claim 1 wherein the light control device is configured to control light emission of the at least one pixel technology-based display panel depending on ambient light upon exceeding a first daylight threshold value, and to switch the at least one pixel technology-based display panel off upon falling below a second daylight threshold value.

8. The light control device as claimed in claim 1 further comprising a computer, wherein the light control device is configured to execute a computer program on the computer to carry out control of light emission of the at least one pixel technology-based display panel.

9. The light control device as claimed in claim 8, wherein the computer program and/or data used by the computer program can only be changed after an authorization, and/or the computer program and/or the data used by the computer program can not be changed by remote access.

10. The light control device as claimed in claim 1 further comprising at least one sealing element configured to protect the light control device from unauthorized access.

11. A system for adapting luminosity depending on ambient light for a display device, comprising:

at least one pixel technology-based display panel for displaying changing motives, wherein the at least one pixel technology-based display panel has a plurality of separately actuatable display pixels, at least one light control device as claimed in claim 1, at least one ambient light sensor connected to the at least one light control device and the at least one pixel technology-based display panel.

12. The system as claimed in claim 11, wherein the at least one pixel technology-based display panel is light-emitting or non-light-emitting or backlit or illuminated.

13. The system as claimed in claim 11 wherein the at least one ambient light sensor and the at least one light control device are designed as one unit with respect to data processing and/or as one assembly with respect to the system.

14. The system as claimed in claim 11 wherein the at least one ambient light sensor and/or the at least one light control device form a structural unit with the at least one pixel technology-based display panel, wherein the at least one pixel technology-based display panel is actuated directly or indirectly by the at least one light control device via a pixel controller.

15. A method of using a system as claimed in claim 11 comprising displaying advertising information and/or other information in a public sphere.

16. The method of claim 15 wherein the public sphere is on vehicles on generally accessible traffic routes, parking areas, and/or in an area close to a road, and/or on stationary devices.

17. A non-transient storage medium encoded with a computer program which when executed by a computer of the light control device as claimed in claim 1 causes the light control device to carry out at least control of the brightness of light emission of the at least one pixel technology-based display panel.

18. The non-transient storage medium as claimed in claim 17 wherein the computer program, when executed by the computer of the light control device, further causes the light control device to permit a maximum directed reflectance of +25% in relation to relative ambient light, and to actuate the at least one pixel technology-based display panel based on the relative ambient light.

19. A light control device for adapting luminosity depending on ambient light for a display device, comprising:

at least one pixel technology-based display panel for displaying changing motifs, wherein the at least one pixel technology-based display panel has a plurality of separately actuatable display pixels, wherein the light control device is configured to evaluate at least one ambient light measured value from at least one ambient light sensor and to operate the at least one pixel technology-based display panel at all times to ensure that an entirety of the at least one pixel technology-based display panel or one or more parts thereof are caused to appear nonluminous depending on the at least one ambient light measured value by controlling light emission of the at least one pixel technology-based display panel, wherein the at least one ambient light measured value comprises a plurality of ambient light measured values, and wherein the light control device is configured to carry out the conversion of the plurality of ambient light measured values from the at least one ambient light sensor into control signals to be output by one or more associations selected from the group consisting of the light limiting value at 100 lux ambient light is approximately 10.5 cd/m$^2$, the light limiting value at 120 lux ambient light is approximately 14.2 cd/m$^2$, the light limiting value at 320 lux ambient light is approximately 45.9 cd/m$^2$, the light limiting value at 500 lux ambient light is approximately 169.6 cd/m$^2$, the light limiting value at 550 lux ambient light is approximately 175.2 cd/m$^2$, the light limiting value at 1000 lux ambient light is approximately 238.0 cd/m$^2$, the light limiting value at 2000 lux ambient light is approximately 400.0 cd/m$^2$, the light limiting value at 3000 lux ambient light is approximately 1238.0 cd/m$^2$, the light limiting value at 5000 lux ambient light is approximately 1400.0 cd/m$^2$, the light limiting value at 10 000 lux ambient light is approximately 2238.0 cd/m$^2$, the light limiting value at 20 000 lux ambient light is approximately 2400.0 cd/m$^2$, the light limiting value at 30 000 lux ambient light is approximately 3238.0 cd/m$^2$, the light limiting value at 38 380 lux ambient light is approximately 3900.0 cd/m$^2$, the light limiting value at 41 000 lux ambient light is approximately 4400.0 cd/m$^2$, the light limiting value at 50 000 lux ambient light is approximately 5500.0 cd/m$^2$, the light limiting value at 75 000 lux ambient light is approximately 8500.0 cd/m$^2$, the light limiting value at 90 000 lux ambient light is approximately 10 500.0 cd/m$^2$, the light limiting value at 100 000 lux ambient light is approximately 11 500.0 cd/m$^2$, and the light limiting value at 110 000 lux ambient light is approximately 12 500.0 cd/m$^2$.

20. A system for continuously adapting luminosity depending on ambient light for a display device, comprising:

at least one pixel technology-based display panel for displaying changing motives, wherein the at least one pixel technology-based display panel has a plurality of separately actuatable display pixels;

at least one light control device comprising at least one pixel technology-based display panel for displaying changing motifs, wherein the at least one pixel technology-based display panel has a plurality of separately actuatable display pixels;

at least one ambient light sensor connected to the at least one light control device and the at least one pixel technology-based display panel, wherein the light control device is configured to evaluate at least one ambient light measured value from at least one ambient light sensor and to operate the at least one pixel technology-based display panel at all times to ensure that an entirety of the at least one pixel technology-based display panel or one or more parts thereof are caused to appear nonluminous depending on the at least one ambient light measured value by controlling light emission of the at least one pixel technology-based display panel, wherein the at least one ambient light sensor comprises at least a first ambient light sensor and at least a second ambient light sensor, and wherein an optimum luminance of the at least one pixel technology-based display panel is generated, wherein ambient light values of the at least a first ambient light sensor are produced using a diffusion lens, and wherein the ambient light values of at least a second ambient light sensor ae produced using a clear lens, wherein the at least a first ambient sensor and the at least a second ambient light sensor each have a light sensor surface positioned parallel to a display surface of the at least one pixel technology-based display panel or are offset with one another.

21. A light control device for adapting luminosity depending on ambient light for a display device, comprising:

at least one pixel technology-based display panel for displaying changing motifs, wherein the at least one pixel technology-based display panel has a plurality of separately actuatable display pixels, wherein the light control device is configured to evaluate at least one ambient light measured value from at least one ambient light sensor and to operate the at least one pixel technology-based display panel at all times to ensure that an entirety of the at least one pixel technology-based display panel or one or more parts thereof are caused to appear nonluminous depending on the at least one ambient light measured value by controlling light emission of the at least one pixel technology-based display panel so that displayed digital information is nearly like analog printed typographic information printed on paper or film, wherein the light control device is configured for switching on the ambient light depending control of the light emission of the pixel technology-based display panel, if a first daylight threshold value is exceeded, and to turn off the ambient light dependent function for controlling the light emission of the pixel technology-based display panel, if a second daylight threshold value is undershot.

* * * * *